Jan. 10, 1928.
B. F. SCHMIDT
1,655,824
MOTOR CONSTRUCTION HAVING COOLING OIL CIRCULATION
Filed Sept. 30, 1925    2 Sheets-Sheet 1
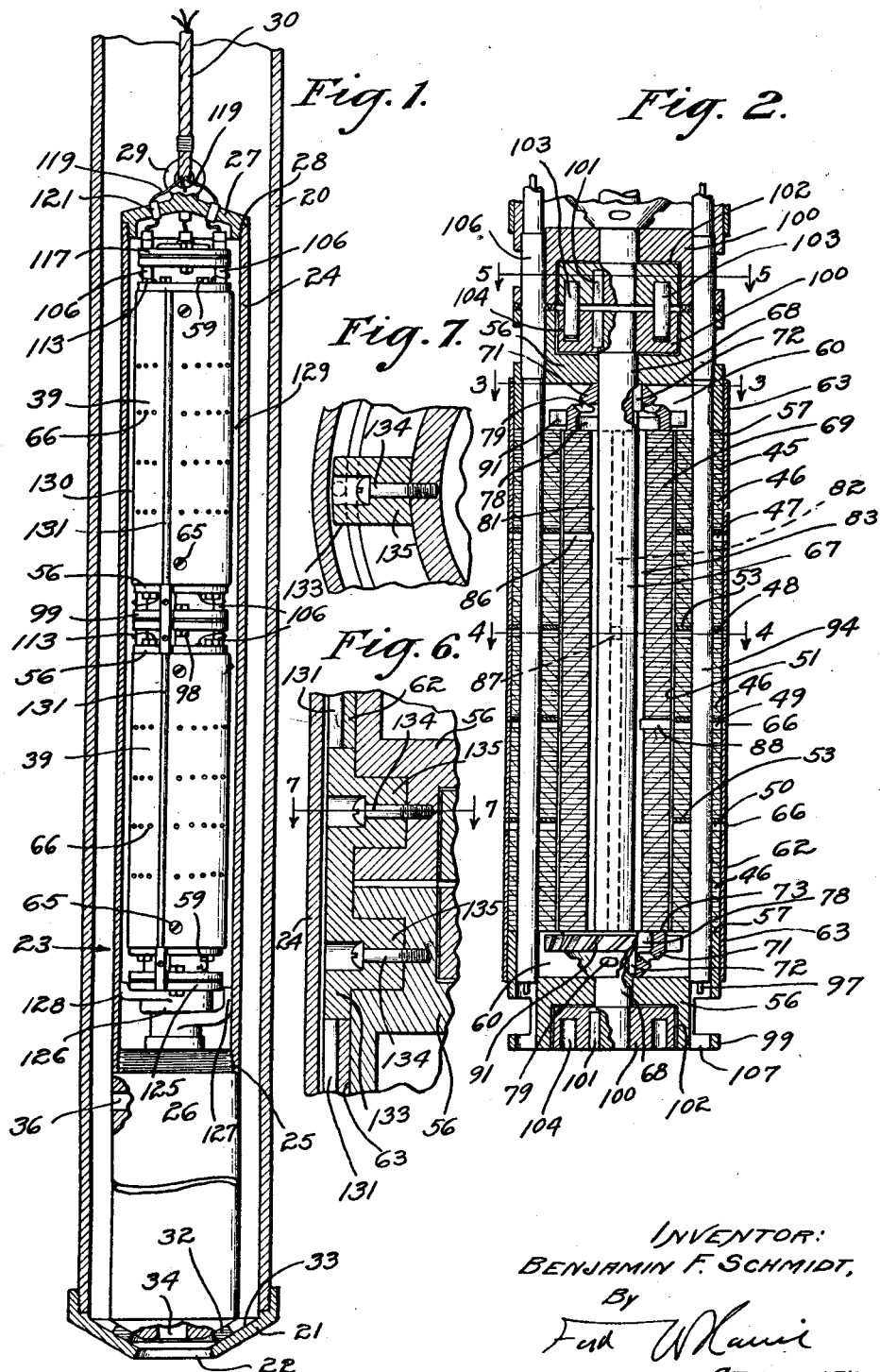
INVENTOR:
BENJAMIN F. SCHMIDT,
By
Fred W Lamie
ATTORNEY.

Jan. 10, 1928.
B. F. SCHMIDT
1,655,824
MOTOR CONSTRUCTION HAVING COOLING OIL CIRCULATION
Filed Sept. 30, 1925     2 Sheets-Sheet 2
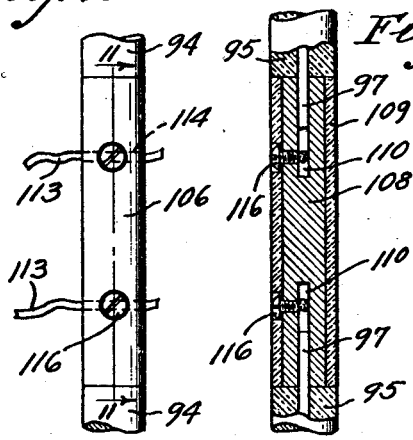
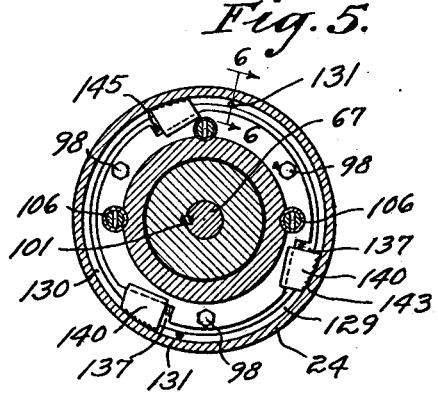
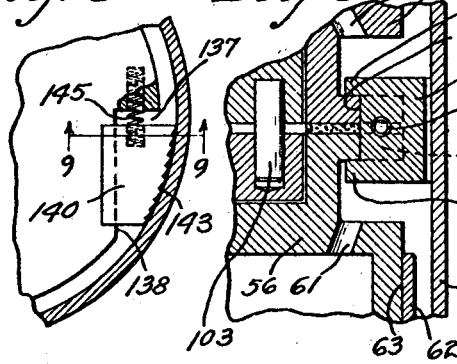
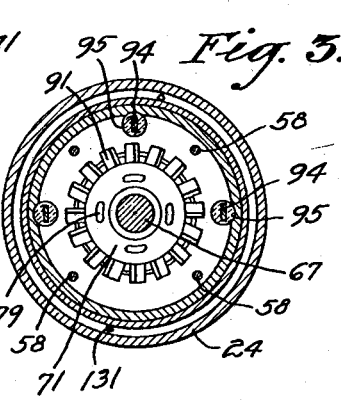
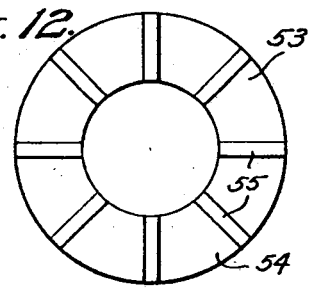
INVENTOR:
BENJAMIN F. SCHMIDT
By
ATTORNEY.

Patented Jan. 10, 1928.

1,655,824

UNITED STATES PATENT OFFICE.

BENJAMIN F. SCHMIDT, OF LOS ANGELES, CALIFORNIA, ASSIGNOR OF ONE-FOURTH TO KING C. GILLETTE AND ONE-FOURTH TO KING G. GILLETTE, BOTH OF LOS ANGELES, CALIFORNIA.

MOTOR CONSTRUCTION HAVING COOLING-OIL CIRCULATION.

Application filed September 30, 1925. Serial No. 59,719.

This invention relates to electric motors and comprises a unique motor construction which is especially applicable in the oil well industry. In this industry it is general practice to pump oil from wells by use of a pump which is situated near the lower end thereof. The plunger of the pump is operated by a walking beam situated on the floor of the derrick of the well, by means of a string of sucker rods. Such pumping equipment possesses disadvantages, both in operation and construction.

In my patent applications entitled Electrically operated oil pump, filed Dec. 9, 1924, Serial No. 754,871, and Motor driven oil well pump, filed Dec. 9, 1924, Serial No. 754,870, I presented to the Patent Office pumping equipment in which the driving means are placed directly adjacent to the pump. This construction eliminates the sucker rods and does away with many of the disadvantages of the present oil pumping equipment.

It is an object of this invention to provide a motor construction comprising a plurality of motor units, which motor construction is particularly adapted for use in conjunction with an oil pump of the character shown in my applications previously referred to.

It is another object of this invention to provide a motor construction having a novel cooling oil circulation whereby the temperature of the motor may be kept comparatively low and the efficiency thereof accordingly increased.

It is also an object of this invention to provide a motor construction having a rotor which serves as an impeller and by which oil is drawn through the rotor and forced through the stator thereof.

It is another object of this invention to provide a motor construction consisting of a plurality of motor units which are secured and adapted to operate together, having a cooling oil circulation around the units as well as having local circulation through each of the units.

It is another object of this invention to provide a motor construction having a rotor to which an impeller wheel is secured for forcing oil or other insulating liquid into the space between the stator and the rotor of the motor, or any other space parallel to the axis of the motor.

It is a further object of this invention to provide a motor construction of this character having a shell which encloses the plurality of motor units and having centralizing means adapted to centralize these motor units in said shell and to hold them in proper alignment.

It is a still further object of this invention to provide a motor construction of the character mentioned in which main electricity feed lines are extended entirely through the motor units and branch feed lines for each of the units are connected therewith.

It is also an object of this invention to provide a motor construction of the character mentioned having a novel form of connector for connecting the main electricity feed lines of adjacent units together.

Other objects and the particular advantages of this invention will be made evident hereinafter.

Referring to the two sheets of drawings in which I illustrate my invention,

Fig. 1 is a diagrammatic view showing the utility of my invention.

Fig. 2 is an enlarged fragmentary vertically sectioned view showing in detail the construction of one of the motor units of my invention.

Fig. 3 is a section taken on the line 3—3 of Fig. 2.

Fig. 4 is a section taken on the line 4—4 of Fig. 2.

Fig. 5 is a section taken on the line 5—5 of Fig. 2.

Fig. 6 is a section taken on the line 6—6 of Fig. 5, and clearly showing a fill-in member of my invention.

Fig. 7 is a section taken on the line 7—7 of Fig. 6.

Fig. 8 is an enlarged fragmentary view showing in detail the centralizing means of my invention.

Fig. 9 is a section taken on the line 9—9 of Fig. 8.

Fig. 10 is an elevational view showing a connector of my invention.

Fig. 11 is a section taken on the line 11—11 of Fig. 10.

Figs. 12 and 13 are views illustrating spacers employed in this embodiment of my invention.

With reference to Fig. 1, 20 indicates a well casing which is extended into an oil well and has a seat member 21 secured at the lower end thereof, this seat member 21 having a central opening 22 formed therethrough. A pump construction 23 including a motor construction having the features of my invention is adapted to be lowered into the well casing 20. The motor construction of my invention has a shell 24 which is threaded at 25 to the upper end of a pump 26. A cap 27 is threaded at 28 to the upper end of the shell 24, this cap 27 having an eye 29 to which a cable 30 is attached, this cable 30 being utilized for lowering into and raising the pump construction from the well casing 20. The pump 26 has a gasket 32 carried on the lower end thereof which is adapted to engage a conical face 33 of the seat member 21 when it is lowered into operating position in the well casing 20. As shown in Fig. 1, the lower end of the well casing 20 is sealed when the pump construction is lowered into operating position.

When the pumping construction is operated, oil is drawn into an intake port 34 of the pump 26 through the opening 22 of the seat member 21 and it is expelled from the pump 26 through an exhaust port 36 into the well casing 20, by means of which oil is conveyed to the surface of the ground.

The motor construction of my invention has a plurality of motor units 39. As clearly shown in Fig. 2, each of the motor units 39 is constructed as follows:

A stator 45 is provided in the form of a plurality of sections 46 which are separated by annular spaces 47, 48, 49 and 50, each of which annular openings connects a cylindrical bore 51 of the stator 45 with the exterior thereof. These annular openings 47 to 50 inclusive are provided by means of spacers 53 which are formed as shown in Figs. 12 and 13. The spacers 53 have a radial wall 54 on which vanes 55 which are of radial extension are formed. These spacers 53 are placed between the sections 46, as shown in Fig. 2 and in Fig. 4. The sections 46 are secured together by end members 56, which have annular faces 57 which engage the opposite ends of the stator 45. Rods 58 extend through the end members 56 and through the stator 45, and nuts 59 are threaded onto extending ends of these rods 58 for the purpose of clamping the end members and the sections 46 of the stator 45 together. The end members 56 are so formed as to provide impeller chambers 60 at the ends of the stator 45, which connect to the outside by openings 61. A sleeve 62 is placed around the stator 45 and around cylindrical portions 63 of the end members 56, being secured in place by screws 65 which are threaded into the cylindrical portion 63 of the end members 56. Openings 66 are formed in the sleeve 62, as shown in Figs. 1, 2 and 4, for connecting the annular openings 47 to 50 inclusive with the exterior thereof.

Extending through the stator 45 is a rotor shaft 67 which is journaled at 68 by the end members 56. A rotor 69 is carried on the shaft 68, this rotor being positioned in the cylindrical bore 51 of the stator 45. The rotor 69 is secured in place by end caps 71 which are positioned in the impeller chambers 60 and which are secured to the shaft 67 by keys 72. The caps 71 have annular faces 73 which engage the ends of the rotor 69. The caps 71 have annular chambers 78 which are connected with the impeller chambers 60 by means of openings 79 formed in these caps 71.

Axial passages 81, 82, 83 and 84 are formed through the rotor 69 along the rotor shaft 67, these passages connecting with the annular chambers 78 of opposite caps 71. Communicating with the axial passage 81 and the exterior of the rotor 69 is a radial passage 86, communicating with the axial passage 82 and the exterior of the rotor is a radial passage 87, communicating with the axial passage 83 and the exterior of the rotor is a radial passage 88, and communicating with the axial passage 84 and the exterior of the rotor is a radial passage 89. The radial passage 86 aligns with the annular opening 47 of the stator 45, the radial passage 87 aligns with the annular opening 48, the radial passage 88 aligns with the annular opening 49 and the radial passage 89 aligns with the annular opening 50.

The lower cap 71 and the upper cap 71 of the motor unit 39, being discussed, are provided with impeller vanes 91, as clearly shown in Figs. 2 and 3. The impeller vanes of the lower cap 71 are extended, as shown in Fig. 2, to exert an upward force when the rotor is operated, and the impeller vanes 91 of the upper cap 71 are positioned to exert a downward force when the rotor is operated.

Extending through the stator 45 is a plurality of main conductors 94 which are surrounded by proper insulation 95. These main conductors 94 are preferably flat, as shown in Fig. 3, and have projections 97 formed at the opposite ends thereof.

The motor units 39 are secured together by bolts 98 which extend through flanges 99 formed at the outer parts of the end members 56. The ends of the rotor shafts 67 have coupling members 100 secured to the ends thereof by keys 101 so that they rest in cavities 102. As shown clearly in Fig. 2, the coupling members 100 are arranged in pairs, one of which members carries a plurality of pins 103 which extend into openings 104 of the adjacent coupling member 100 for drivably associating the coupling members together and therefore drivably associating the rotor shafts 67 together.

The main conductors 94 are attached to gether by means of connectors 106 which extend through openings 107 formed in the end members 56. As shown in Figs. 10 and 11, each of the connectors 106 has a metallic body 108 which is surrounded by suitable insulating material 109. The body 108 has sockets 110 in which the flat projections 97 of the main conductors 94 are received. These connectors 106 are arranged in position as the motor units 39 are attached together. Leads 113 of the different motor units 39 are attached to the connectors 106 for supplying electricity to these motor units, as shown in Figs. 10 and 11. An opening 114 is provided through the insulation 109 and through the metallic body 108. The ends of the leads 113 are extended through these openings 114 and are locked therein by means of screws 116. The upper motor unit 39 has a cover 117 secured to the upper flange 99 of the upper end member 56 thereof in order to close the upper end of the unit.

Main feed lines 119 extend from the surface of the ground to the motor construction through the cable 30. These main lines 119 extend through the cap 27 which is provided with suitable bushings 121, and are connected to the upper connectors 106.

The lower flange 99 of the lower motor unit 39 is secured to a flange 125 of a centrifugal oil circulating pump 126 which is interposed between the motor construction and the pump 26. The centrifugal oil pump 126 has an inlet 127 and an outlet 128 which are diametrically opposed, as shown in Fig. 1. When the pump construction is in operation, oil is taken from one half of the motor construction and delivered to the other half thereof. The space in the shell 24 around the motor units 39 is divided into two longitudinal oil passages 129 and 130 by means of members 131 which are extended along the motor unit 39 and are secured to the outer faces of the sleeves 62. The members do not, however, engage the shell 24. Fill-in portions 133 are secured between the ends of the sleeves 62 of adjacent motor units 39, as clearly shown in Figs. 6 and 7. These fill-in portions 133 are formed with projections 135 to fill in the spaces around the flanges 99. Screws 134 are provided for securing the fill-in portions 133 in place.

As clearly shown in Figs. 5, 8 and 9, the pairs of flanges 99 which are secured together are provided with notches 137 having flat faces 138 against which faces 139 of centralizing jaws 140 rest. The jaws 140 have lips 141 which extend inwardly at each side of the pairs of flanges 99 for preventing their being removed sidewardly from place. The jaws 140 have outer arcuated toothed faces 143, and the jaws 140 are forced by springs 145 so that the toothed faces 143 engage an inner face of the shell 24. Each of the pairs of flanges 99 is provided with three sets of jaws 140, which have the function of centralizing the motor units 39 inside the shell 24 and of retaining them in proper alignment. The shell 24 is kept full of cooling oil.

The operation of my invention is substantially as follows:

Electricity is supplied to the main conductors 94 of the pump construction by means of the main feed lines 119. The electricity is taken from the main lines 94 and delivered to the motor units 39 by means of the branch lines 113. When the motor units 39 are energized, the rotors 69 are revolved. All of the rotors, being coupled together, cooperatively actuate the internal mechanism (not shown) of the pump 26. The pump 26 at this time draws oil through the port 34 and delivers it through the port 36 to the interior of the well casing 20.

The mechanism of the oil circulating pump 126 at this time is operated, and the cooling oil in the shell 24 is drawn into the inlet 127 and delivered through the outlet 128. Due to the fact that the interior of the shell 24 around the motor units 39 is divided into two longitudinal passages 129 and 130, the oil will flow upward through the passage 130 and downward through the passage 129. This cooling oil flows into the impeller chambers 60 of the motor units 39 through the opening 61 provided in the end members 56. The cooling oil passes into the annular chamber 78 of the caps 71 through the openings 79 and passes through the axial passages 81 to 84 inclusive of the rotors 69. This oil is drawn outwardly from these passages by centrifugal force through the radial passages 86 to 89 inclusive. The oil is by reason of the centrifugal force caused to flow through the annular openings 47 to 50 inclusive of the stators 45 and flows to the interior of the motor units 39 through the openings 66 of the sleeves 62. The impeller vanes 91 of the caps 71 act upon the cooling oil in the impeller chambers 60 and force this oil into the spaces in the cylindrical bores 51 around the rotors 69 from each end thereof.

The centralizing jaws 140, as previously mentioned, are moved by the springs 145 so that the toothed faces 143 thereof engage the inner face of the shell 24. When the pump is set into operation, there is a slight rotational tendency of the motor units 39, as a whole, and these jaws 140 are caused to grip the inner face of the shell 24 very firmly. These jaws 140 are self-adjusting and not only firmly hold the motor units 39 in place but they also centralize them and retain them in proper operating alignment.

From the foregoing description the various features of my invention are apparent. The feature of providing oil cooling circulation for my motor construction is extremely important. By having efficient cooling circulation, the motor units are kept comparatively cool and the efficiencies of these units are markedly increased. The motor construction, as a whole, has a general circulation which is provided by the circulating pump 126, the general circulation being conducted through the longitudinal passages 129 and 130 and also has a local oil circulation for each of the motor units 39. This local circulation takes place through the rotors 69 themselves and also between rotors and stators. This brings the cooling oil into contact with the interior of the rotor and the stator and between the two, thus providing efficient cooling. The rotors 69 serve as impellers for circulating the cooling oil through the motor units 39. This is a very important feature which can be conveniently and economically incorporated in the motor units. The impeller vanes 91 are also valuable in establishing a cooling circulation through the cylindrical bores 51 around the rotors 69.

It may under certain circumstances be desirable only to use the circulation through the rotors and stators, or only between the rotors and the stators. The centralizing means of my invention permits a very ready assembling of the motor units 39 and their assembling in the shell 24. The self-locking and self-adjusting features of the centralizing jaws 140 are important. It should be understood that in the drawings I have shown the motor construction as including only two units, but in actual practice I may use quite a number of motor units, which form a motor construction of considerable length. It is in long motor constructions that the centralizing means shown is most valuable. In motor constructions employing only two units, it would be possible to use pins or other means for securing the units 39 in the shell 24. The use of the connectors 106 and their particular construction permits a quick attaching of the main conductors 94 together, which attachment may be accomplished when the motor units 39 are being secured together.

I claim as my invention:

1. In an electrical power unit, the combination of: a fluid-tight shell containing a body of oil serving as an electrical insulating and a circulating cooling medium; an electric motor entirely and continuously submerged in said oil and spaced from said shell to form an annular oil chamber surrounding said motor, said motor comprised of a stator having a cylindrical bore and a plurality of transverse passages communicating only with said bore and said oil chamber, and a rotor arranged in said bore and provided with an axial passage therethrough and a plurality of radial ports communicating with said axial passage and the bore of the stator, said ports being respectively aligned with said transverse passages in the stator, whereby when the rotor is revolved the oil is drawn through said axial passage and expelled through said radial ports and said transverse passages into said oil chamber; and means for maintaining such circulation while the motor is in operation.

2. In an electrical power unit, the combination of: a fluid-tight shell containing a body of oil serving as an electrical insulating and a circulating cooling medium; an electric motor entirely and continuously submerged in said oil and spaced from said shell to form an annular oil chamber surrounding said motor, said motor comprised of a stator having a cylindrical bore and a plurality of transverse passages communicating only with said bore and said oil chamber, and a rotor arranged in said bore and provided with an axial passage therethrough and a plurality of radial ports communicating with said axial passage and the bore of the stator, said ports being respectively aligned with said transverse passages in the stator, whereby when the rotor is revolved the oil is drawn through said axial passage and expelled through said radial ports and said transverse passages into said oil chamber; means enclosing the opposite ends of said stator and rotor and forming end chambers communicating only with said axial rotor passage and said cylindrical stator bore and with said annular oil chamber; and means within said respective end chambers and rotatable with said rotor for drawing oil from said annular oil chamber into said end chambers and forcing said oil towards the center of said motor.

3. In an electrical power unit, the combination of: a fluid-tight shell containing a body of oil serving as an electrical insulating and a circulating cooling medium; an electric motor entirely and continuously submerged in said oil and spaced from said shell to form an annular oil chamber surrounding said motor, said motor comprised of a stator having a cylindrical bore and a plurality of transverse passages communicating with said bore and said oil chamber, and a rotor arranged in said bore and provided with an axial passage therethrough and a plurality of radial ports communicating with said axial passage and the bore of the stator, said ports being respectively aligned with said transverse passages in the stator, whereby when the rotor is revolved the oil is drawn through said axial passage and expelled through said radial ports and said transverse passages into said oil chamber; means for maintaining such circulation while the motor is in operation; means longitudinally dividing said annular oil chamber to form opposite longitudinal oil passages extending the full length of said motor; and means for effecting a constant circulation of oil through said longitudinal oil passages respectively in opposite axial directions.

4. In an electrical power unit, the combination of: a fluid-tight shell containing a body of oil serving as an electrical insulating and a circulating cooling medium; an electric motor entirely and continuously submerged in said oil and spaced from said shell to form an annular oil chamber surrounding said motor, said motor comprised of a stator having a cylindrical bore and a plurality of transverse passages communicating with said bore and said oil chamber, and a rotor arranged in said bore and provided with an axial passage therethrough and a plurality of radial ports communicating with said axial passage and the bore of the stator, said ports being respectively aligned with said transverse passages in the stator, whereby when the rotor is revolved the oil is drawn through said axial passage and expelled through said radial ports and said transverse passages into said oil chamber, means enclosing the opposite ends of said stator and rotor and forming end chambers, communicating with said axial rotor passage and said cylindrical stator bore and with said annular oil chamber; impeller means within said respective end chambers and rotatable with said rotor for drawing oil from said annular oil chamber into said end chambers and forcing said oil towards the center of said motor; partition means longitudinally dividing said annular oil chamber to form opposite longitudinal oil passages extending the full length of said motor; and an oil pump for circulating oil up one of said longitudinal passages and down the other of said longitudinal passages.

5. In an electrical power unit, the combination of: a fluid-tight shell containing a body of oil serving as an electrical insulating and a circulating cooling medium; an electric motor entirely and continuously submerged in said oil and spaced from said shell to form an annular oil chamber surrounding said motor; means longitudinally dividing said annular oil chamber to form opposite longitudinal oil passages extending the full length of the motor; and means for effecting a constant circulation of oil up one and down the other of said longitudinal oil passages.

In testimony whereof, I have hereunto set my hand at Los Angeles, California, this 24th day of Sept., 1925.

BENJAMIN F. SCHMIDT.